(12) United States Patent
Russ et al.

(10) Patent No.: US 8,958,184 B2
(45) Date of Patent: Feb. 17, 2015

(54) ESD PROTECTION DEVICES AND METHODS

(75) Inventors: Christian Russ, Diedorf (DE); Werner Hoellinger, Villach (AT); Bernhard Stein, Munich (DE)

(73) Assignee: Infineon Technologies AG, Neubiberg (DE)

( * ) Notice: Subject to any disclaimer, the term of this patent is extended or adjusted under 35 U.S.C. 154(b) by 796 days.

(21) Appl. No.: 12/979,635

(22) Filed: Dec. 28, 2010

(65) Prior Publication Data
US 2012/0162833 A1 Jun. 28, 2012

(51) Int. Cl.
*H02H 9/00* (2006.01)
*H02H 9/04* (2006.01)

(52) U.S. Cl.
CPC .................. *H02H 9/046* (2013.01)
USPC .......................................... 361/56

(58) Field of Classification Search
CPC ....................................... H02H 9/00
USPC .......................................... 361/56
See application file for complete search history.

(56) References Cited

U.S. PATENT DOCUMENTS

| | | | | |
|---|---|---|---|---|
| 6,043,969 A | * | 3/2000 | Sharpe-Geisler | 361/111 |
| 6,173,427 B1 | * | 1/2001 | Tsukagoshi | 714/724 |
| 6,369,648 B1 | * | 4/2002 | Kirkman | 330/43 |
| 6,920,026 B2 | * | 7/2005 | Chen et al. | 361/56 |
| 7,570,468 B2 | * | 8/2009 | Bernard et al. | 361/56 |
| 7,893,710 B2 | * | 2/2011 | Lee | 326/30 |
| 8,009,397 B2 | * | 8/2011 | Etherton et al. | 361/56 |
| 8,194,373 B2 | * | 6/2012 | Padden | 361/56 |
| 2006/0176626 A1 | * | 8/2006 | Griesbach et al. | 361/56 |
| 2007/0053120 A1 | * | 3/2007 | Gauthier et al. | 361/56 |
| 2007/0195475 A1 | * | 8/2007 | Suzuki | 361/92 |

\* cited by examiner

*Primary Examiner* — Rexford Barnie
*Assistant Examiner* — Joseph Inge
(74) *Attorney, Agent, or Firm* — Eschweiler & Associates, LLC

(57) ABSTRACT

Various embodiments described below relate to an ESD protection device that includes a voltage controlled shunt (e.g., a transistor) to selectively shunt energy of an incoming ESD pulse away from a circuit that includes a semiconductor device to be protected. In some embodiments, the ESD protection device includes a power up detection element to determine whether the circuit has powered up. If the circuit is powered up, the power up detection element prevents inadvertent triggering of the ESD protection device.

14 Claims, 4 Drawing Sheets

US 8,958,184 B2

ESD PROTECTION DEVICES AND METHODS

BACKGROUND

An electrostatic discharge (ESD) pulse is a sudden and unexpected voltage and/or current discharge that transfers energy to an electronic device from an outside body (e.g., a human body, which can be approximated in modeling by a human body model (HBM)). ESD pulses can damage electronic devices, for example by "blowing out" a gate oxide of a transistor in cases of high voltage or by "melting" an active region area of a device in cases of high current, causing junction failure. If devices are damaged by an ESD pulse, the electronic product can be rendered less operable than desired, or can even be rendered inoperable altogether.

To protect electronic devices from ESD pulses, engineers have developed ESD protection devices. FIG. 1 shows an example of an integrated circuit 100 that includes one or more semiconductor devices 102, which are coupled to an exterior circuit assembly (not shown) via an external IC pin 104. The external IC pin 104 can be a supply pin that supplies a DC supply voltage (e.g., VDD or VSS) to the devices 102, or can be an input/output (I/O) pin that transfers input or output signals there from, for example. A conventional ESD protection device 106 is coupled between the semiconductor device (s) 102 and the external pin 104 to mitigate damage due to an ESD pulse 108. If an ESD pulse 108 occurs, the ESD protection device 106 detects the ESD pulse 108 and shunts the energy associated with it away from the semiconductor device(s) 102 (e.g., as shown by arrow $W_{ESD}$), thereby preventing damage to the semiconductor device(s) 102.

The inventors have appreciated that a conventional ESD protection device 106 suffers from a shortcoming in that it can be inadvertently triggered by harsh circuit conditions (e.g., overvoltage spikes, injection of substrate currents). Such inadvertent triggering can arise in some instances due to the fact that modern system on chip (SoC) designs integrate many different functional blocks onto a single IC. For instance, some mobile phone ICs integrate a digital baseband core with analog blocks like a power management unit, RF transceiver, and mixed signal sub-circuits. These blocks can switch at different frequencies and can each require a different power supply domain. Because of this, operation of one block can cause voltage spikes on its own supply voltage or on the voltage supply of another block. Although these voltage spikes are part of the "normal" operation of the device 102 and are often tolerable in-and-of themselves, these voltage spikes can look like ESD events in some regards. Hence, the voltage spikes can inadvertently trigger the ESD protection device 106. If the ESD protection device 106 is inadvertently triggered, the ESD protection device 106 can shunt normal operating power away from the semiconductor device 102, thereby hampering proper operation of the semiconductor device 102.

In view of the above, the inventors have devised ESD protection techniques that provide adequate ESD protection while concurrently helping to ensure that harsh circuit conditions (e.g., overvoltage spikes) do not inadvertently trigger the ESD device.

DETAILED DESCRIPTION

Figure 1:
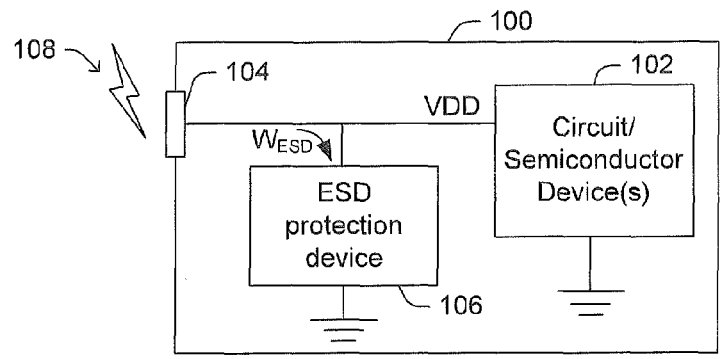
FIG. 1 shows an integrated circuit that makes use of a conventional ESD protection device.

One or more implementations of the present invention will now be described with reference to the attached drawings, wherein like reference numerals are used to refer to like elements throughout. The drawings are not necessarily drawn to scale.

Various embodiments described below relate to ESD protection devices that include a power up detection element to determine whether a circuit, which is to be protected from ESD pulses, has powered up. If the circuit is not powered up (e.g., if the circuit is still on the assembly line of a manufacturing plant), the power up detection element allows—in conjunction with a voltage controlled shunt element—energy to be shunted away from the circuit to be protected, thereby preventing energy of an incoming ESD event from damaging the circuit. In contrast, if the circuit is powered up, the power up detection element limits or prevents energy from being shunted away from the circuit to be protected. In this way, even if normal operation of the circuit causes voltage spikes (which could lead to normal operating power being shunted away from the circuit, absent countermeasures), the power up detection element prevents these spikes from inadvertently shunting normal operating power away from the circuit while the circuit is powered up.

Figure 2:
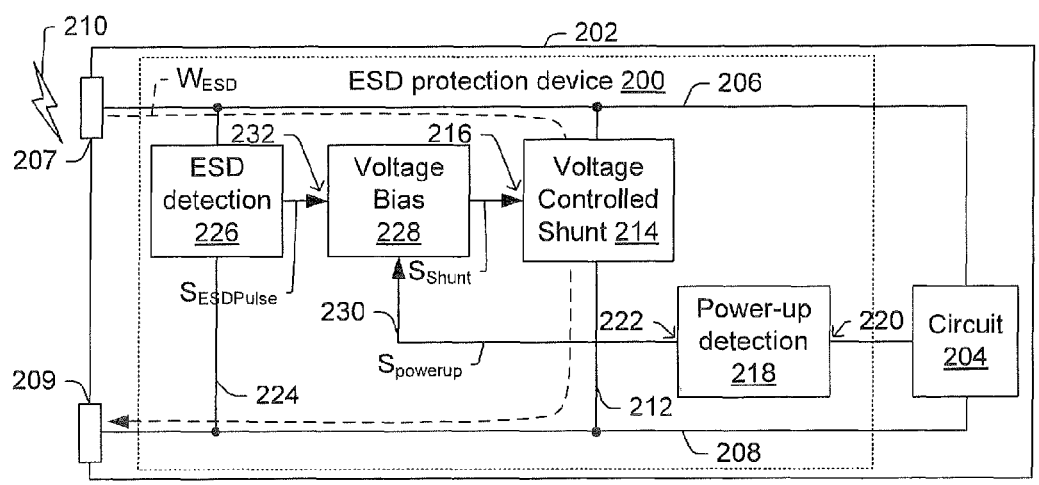
FIG. 2 shows a functional block diagram of an ESD protection device in accordance with some embodiments.

Referring now to FIG. 2, one can see an ESD protection device 200 in accordance with some embodiments. Like the previously discussed implementation of FIG. 1, the ESD protection device 200 can be included on an integrated circuit 202 that includes one or more circuits to be protected 204. The circuit 204 can be coupled to first and second circuit nodes 206, 208, respectively (e.g., $V_{dd}$, $V_{ss}$ supplies, respectively), which can be associated with first and second external IC pins 207, 209, respectively. It will be appreciated that although FIG. 2 shows the first and second circuit nodes 206, 208 coupled to external IC pins 207, 209, in other embodiments the first and second circuit nodes 206, 208 can be located on internal nodes within the IC 202 or can be associated with discrete devices rather than an IC.

The ESD protection device 200 includes a first electrical path 212 extending between the first and second circuit nodes 206, 208, wherein a voltage controlled shunt 214 having a control terminal 216 is disposed on the first electrical path 212. A voltage bias element 228 provides a shunt control signal, $S_{shunt}$, to control the amount of energy, if any, shunted from the first circuit node 206 to the second circuit node 208 over the voltage controlled shunt 214. The voltage bias element 228 includes a first input coupled to an ESD detection element 226 and a second input coupled to a power up detection element 218, wherein the ESD detection element 226 is disposed on a second electrical path 224 that is in parallel with the first electrical path 212.

During operation, the power up detection element 218 monitors the circuit 204, and provides a power-up signal. $S_{Powerup}$, so as to indicate whether the circuit 204 is powered up or not. In contrast, the ESD detection element 226 monitors voltage on the first circuit node 206 and activates an ESD pulse signal, $S_{ESDPulse}$, based on whether the monitored voltage is representative of an incoming ESD pulse. As explained in more detail below, the voltage bias element 228 provides the shunt control signal. $S_{shunt}$, based on both the power up control signal. $S_{Powerup}$, and the ESD Pulse signal, $S_{ESDPulse}$.

If the circuit 204 is not yet powered up (e.g., is turned off or is in the process of powering up), the power-up control signal, $S_{Powerup}$, is deactivated. While $S_{Powerup}$ is deactivated, the voltage bias element 228 "assumes" that, if necessary, it is safe to shunt energy away from the circuit 204. Hence, if the ESD pulse signal is activated (i.e., an ESD event is detected by ESD detection element 226), the voltage bias element 228 asserts the shunt control, $S_{shunt}$, to put the voltage controlled shunt 214 in a low resistance state, thereby shunting energy from the first circuit node 206 to the second circuit node 208 to protect the circuit 204 from an incoming ESD pulse.

However, after the circuit 204 has powered up, the circuit 204 can cause voltage spikes on the first circuit node 206 that look similar to ESD pulses. Hence, the ESD detection element 226 can inadvertently assert the ESD pulse signal based on a "normal" voltage spike in some instances. Such an inadvertent assertion of the ESD pulse signal could lead to normal operational power being diverted from the circuit 204, absent countermeasures.

To limit the effects of inadvertent ESD pulse signals, the power-up detection element 218 selectively activates the power up signal, $S_{powerup}$, to notify the voltage bias element 228 when the circuit 204 is powered up. The voltage bias element 228 then adjusts the shunt control signal, $S_{shunt}$, to ensure the voltage controlled shunt 214 remains in a highly resistive state so long as the circuit 204 is powered up. In this way, the power-up detection element 218 helps ensure that "normal" voltage spikes don't divert normal operating power from the first node 206 to the second node 208 during normal operation.

The voltage controlled shunt 214 can take different forms depending on the implementation. For example, in some embodiments, voltage controlled shunt 214 can be a transistor (e.g., an n-type MOSFET), and the shunt control signal. $S_{shunt}$, consists of a gate voltage. In particular embodiments, the MOSFET transistor can be a drain-extended (DEMOS) transistor that is tolerant of high drain-to-source voltage and allowing the switching of such voltages. DEMOS transistors are not only helpful in safely dissipating large voltages (e.g., due to ESD pulses), but they are also advantageous in the context of the present invention because they are often compatible with the manufacturing processes used for the other devices on chip. In other embodiments, the voltage controlled shunt can include multiple switching elements (see e.g., FIG. 5 discussed further herein).

Figure 3A:
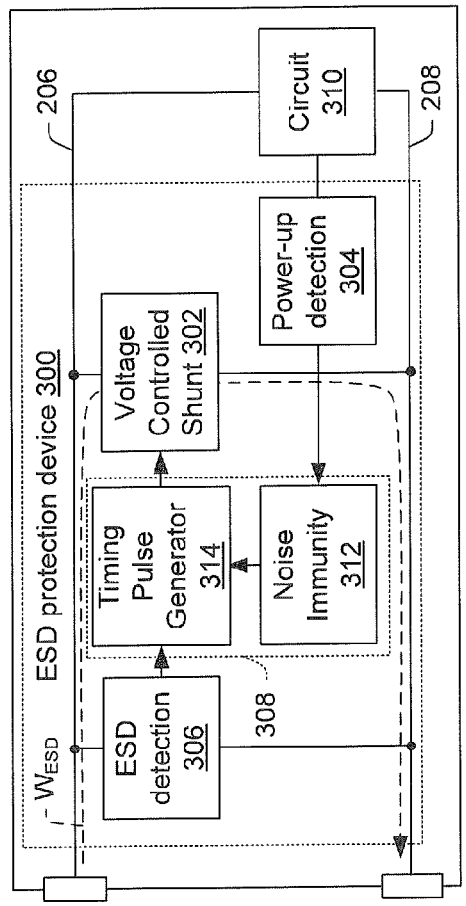
FIG. 3A shows a functional block diagram of an ESD protection device in accordance with some embodiments.

FIG. 3A shows another implementation of an ESD protection device 300 in block diagram view. The ESD protection device 300 includes a voltage controlled shunt 302, a power up detection element 304, an ESD detection element 306, and a voltage bias element 308, which are operably coupled as shown to protect a circuit 310 from ESD events. In this embodiment, the voltage bias element 308 includes a noise immunity circuit 312 and a timing pulse generator 314, which are also operably coupled as shown.

Figure 3B:
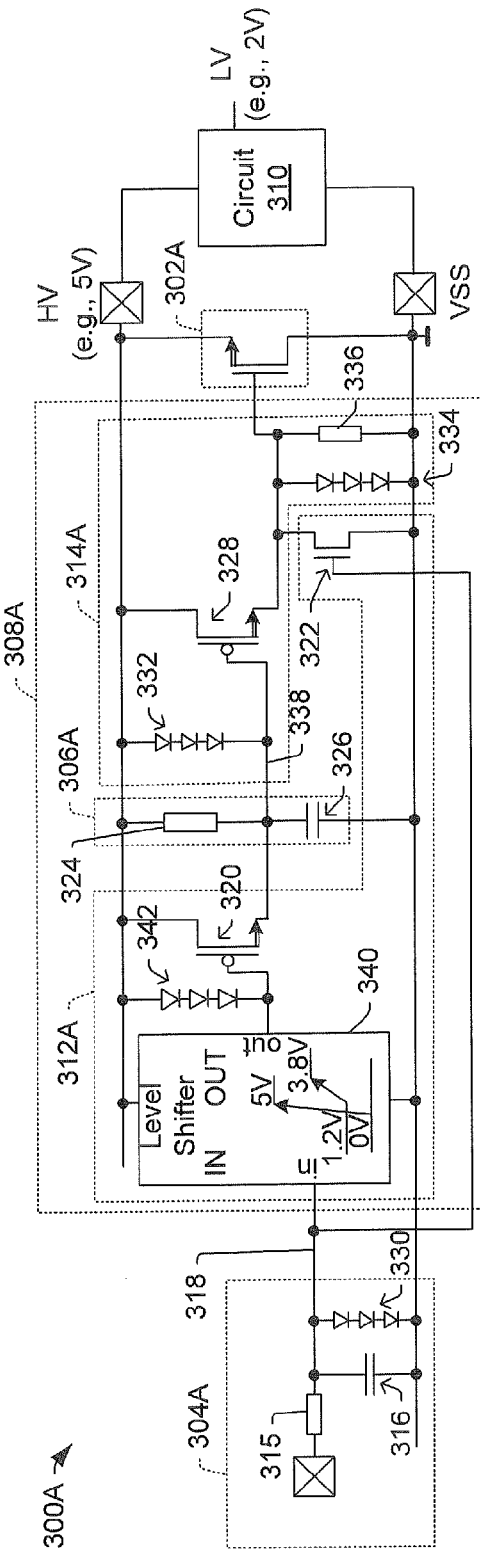
FIG. 3B shows a circuit schematic of an ESD protection device consistent with FIG. 3A's embodiment.

FIG. 3B shows a circuit implementation consistent with the ESD protection device 300 of FIG. 3A and is labeled accordingly. For example, n-type shunt transistor 302A in FIG. 3B corresponds to one example of how voltage controlled shunt 302 in FIG. 3A can be realized; element 304A in FIG. 3B corresponds to one example of how power up detection element 304 in FIG. 3A can be realized; and so on.

During operation, the power up detection element 304A, which may comprise a resistor 315 and a capacitor 316, monitors the circuit 310 to see whether it is powered up or not. The power up detection element 304A provides a power up control signal 318 having a voltage level indicative whether the circuit 310 is powered up. In other embodiments, the power up detection element 304A could be a connection to a logic signal indicating the circuit 310 is powered up, or could be a connection to another power domain.

If the circuit 310 is not yet powered up (e.g., is turned off or is in the process of powering up), the power-up control signal 318 disables the noise immunity circuit 312A, which correspondingly turns p-type transistor 320 and n-type transistor 322 off. Hence, when the circuit 310 is not yet powered up but an ESD event is likely to hit the first circuit node 206, the ESD detection element 306A, which comprises a resistor 324 in series with a capacitor 326, selectively drives a gate of p-type transistor 328. This P-type transistor 328 then sets the gate voltage to the shunt transistor 302A based solely on the ESD pulse signal provided on node 338. Voltage limiters (e.g. strings of diodes 330, 332, 334, 342) and a resistor 336 may also help to set the gate voltage delivered to the shunt transistor 302A and provide local overvoltage protection for the gates of the respective transistors in block 340, and for transistors 328, 320, 302A, respectively.

Consequently, if an ESD pulse occurs when the circuit 310 is not yet powered up, operation can be as follows. The incoming ESD pulse typically causes the voltage at the first node 206 to rapidly rise. Because of the presence of the capacitor 326, the voltage at node 338 rises slowly in accordance with an RC time constant, such that pulling the ESD pulse signal on 338 is low for a predetermined time to indicate the ESD pulse. This ESD pulse signal enables transistor 328, thereby raising the gate voltage provided to the shunt transistor 302A and allowing the ESD pulse to pass there over without damaging the circuit 310. After the predetermined time, the capacitor 326 is charged via resistor 324, which sets the ESD pulse signal on node 338 to a high voltage, thereby disabling transistors 328 and 302A. Any remaining charge at the gate of shunt transistor 302A will be removed by the resistor 336 pulling down the gate of shunt transistor 302A likely after the ESD event. In these ways, after the ESD event has likely passed, the shunt transistor 302A is in a high resistance state so normal operating power is again delivered to the circuit 310.

In contrast, if the circuit 310 is powered up, the power up control signal 318 enables the noise immunity circuit 312A including the p-type transistor 320 and n-type transistor 322. The inverting level shifter 340 helps to prevent an overly large gate-source voltage from being applied to transistor 320, which is often a DEMOS type device and therefore may tolerate only small gate-source voltages. Hence, when the circuit 310 is powered up, the p-type transistor 320 and n-type transistor 322 both tend to keep shunt transistor 302A disabled. In this way, the power up control signal 318 helps prevent accidental triggering of the shunt transistor 302A when the circuit 310 is powered up, such that the ESD protection circuit 300A helps to prevent or limit the adverse effects of the ESD detection element 306A inadvertently asserting an ESD pulse signal on node 338.

In many embodiments, the elements 302A, 320, and 328 are drain-extended MOS devices (DEMOS transistors). DEMOS transistors provide an efficient way of switching relatively high voltages, while such transistors can be manufactured without adding complexity to the processing technology for the integrated circuit. Other transistors (e.g., 322)

could also be DEMOS transistors, although there may be fewer advantages to implementing these other transistors in DEMOS form.

It will be appreciated that although FIG. 3B shows an ESD detection element 306A in the form of an RC trigger element, other ESD detection elements could also be used, including but not limited to: an output of supply noise detector (e.g., voltage detector), or a control signal provided from a neighboring voltage domain (e.g., neighboring sector on the circuit) in which an ESD event is detected.

Figure 4:
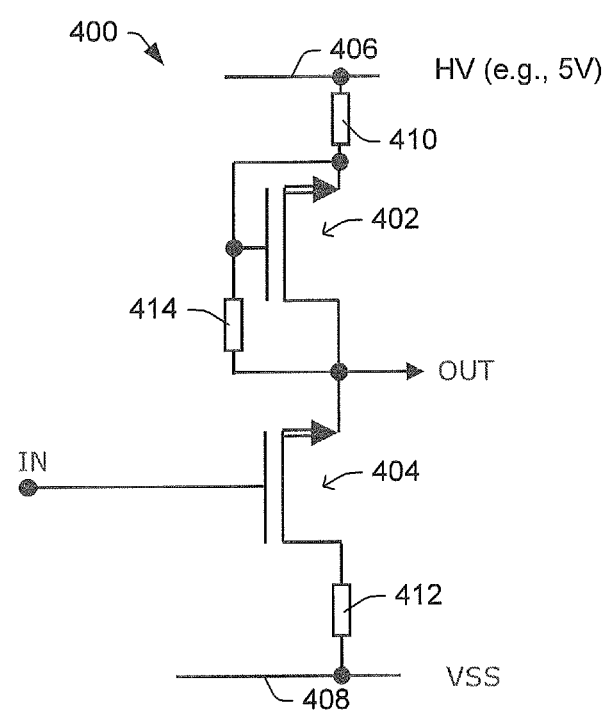
FIG. 4 shows a circuit schematic of level shifter in accordance with some embodiments.

FIG. 4 shows an embodiment of a level shifter circuit 400 in accordance with some embodiments. The level shifter 400 includes first and second switching elements 402, 404 disposed along a current path extending between upper and lower DC supply voltages 406, 408, respectively. A first resistor 410 is disposed between the drain of the first switching element 402 and the upper DC supply voltage 406, and a second resistor 412 is disposed between the source of the second switching element 404 and the lower DC supply voltage 408. A third resistor 414 is provided in parallel with the first switching element 402 as shown. When an input voltage (IN) is high (e.g. 1.2V), the second switching element 404 is enabled, thereby pulling the output (OUT) down towards the lower DC supply voltage 408 (e.g. down to 5V−1.2V=3.8V). In contrast, when the input voltage is low, the second switching element 404 is open and the output is pulled up towards the upper voltage 406 (e.g. 5V). The upper and lower 406 and 408 DC supply voltages of the level shifter circuit 400 are connected to the high voltage node 206 and the VSS 208 of the ESD protection device 200, respectively.

Figure 5:
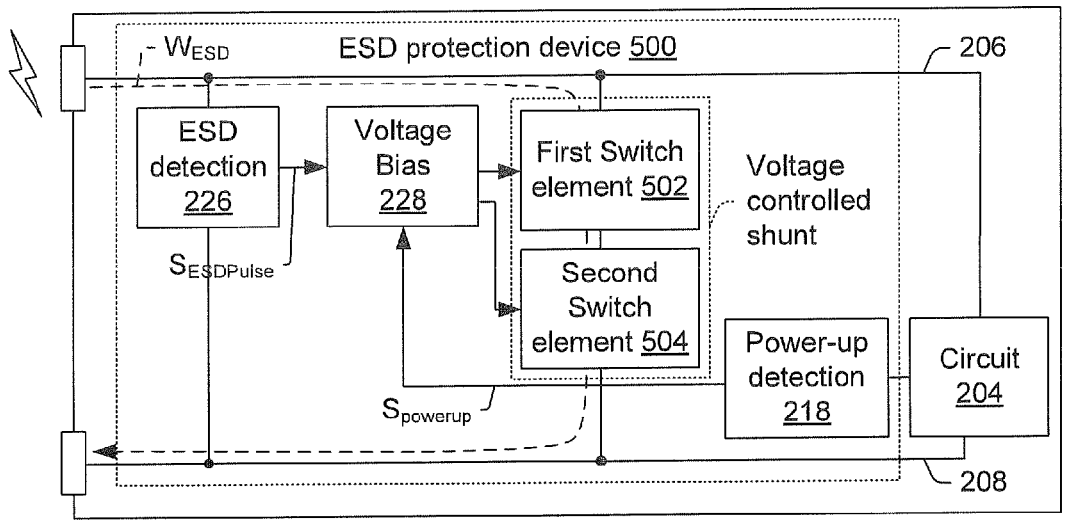
FIG. 5 shows a functional block diagram of an ESD protection device in accordance with some embodiments.

FIG. 5 shows another embodiment of an ESD protection device 500 in accordance with some embodiments. In this embodiment, the voltage controlled shunt is made up by at least two switching elements in series on a first electrical path (e.g., first switching element 502, second switching element 504). When a power-up detection element 218 notifies the voltage bias element 228, that the circuit is not yet powered up, the ESD detection element 226 can selectively enable shunting of energy over the first and second switches via the voltage bias element 228. In contrast, when the power up detection element 218 notifies the voltage bias element 228 that the circuit is powered up, the voltage bias element can open one of the switches, thereby ensuring that energy is not shunted over the first electrical path, regardless if voltage spikes cause the ESD detection element 226 to send an ESD pulse signal.

Figure 6:
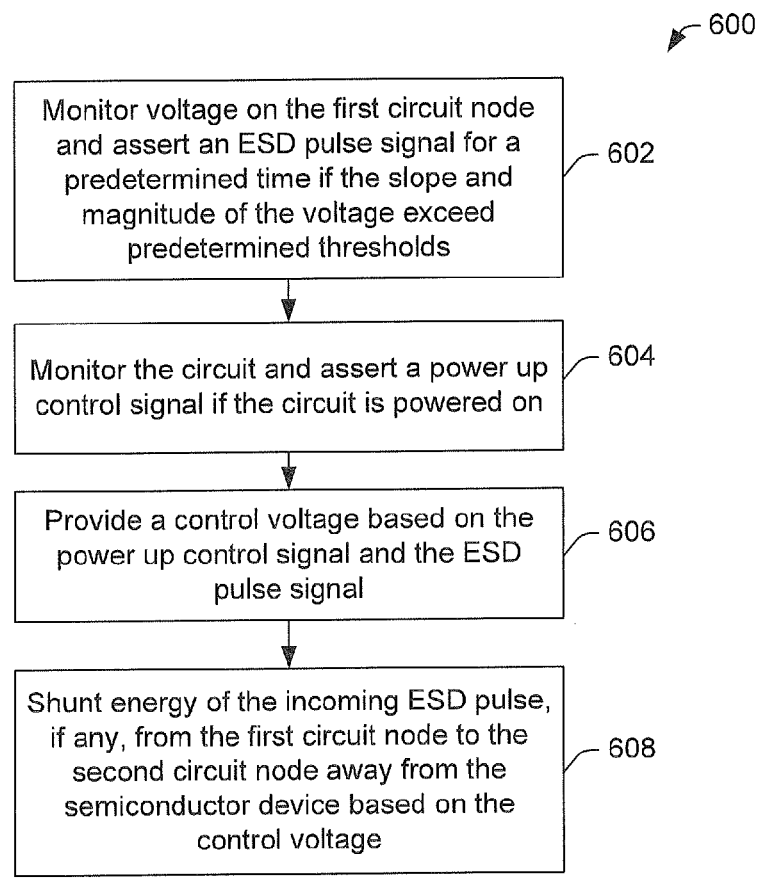
FIG. 6 shows a method in flowchart format in accordance with some embodiments.

FIG. 6 shows a method for ESD protection in accordance with some embodiments of the present disclosure. While these methods are illustrated and described below as a series of acts or events, the present disclosure is not limited by the illustrated ordering of such acts or events. For example, some acts may occur in different orders and/or concurrently with other acts or events apart from those illustrated and/or described herein. Further, one or more of the acts depicted herein may be carried out in one or more separate acts or phases.

The method 600 is discussed in the context of an ESD protection device that includes a voltage controlled shunt coupled between first and second circuit nodes and which is arranged to selectively shunt power of an incoming ESD pulse from the first circuit node to the second first circuit node and away from a circuit that includes a semiconductor device to be protected. Although FIGS. 2-5 show examples of ESD protection devices that fit this description, it will be appreciated that this method is not limited to the ESD protection devices illustrated in FIGS. 2-5 and can include other ESD protection devices.

The method starts at 602 by monitoring voltage on the first circuit node and asserting an ESD pulse signal for a predetermined time if the slope and the magnitude of the voltage exceed predetermined thresholds.

At 604, the method monitors the circuit and asserts a power up control signal if the circuit is powered up.

At 606, the method provides a control voltage based on both the power up control signal and the ESD pulse signal.

At 608, the method shunts power of the incoming ESD pulse, if any, from the first circuit node to the second circuit node away from the semiconductor device based on the control voltage.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An electrostatic discharge (ESD) protection device to protect a circuit coupled to first and second circuit nodes from an ESD event, the ESD protection device comprising:

a first electrical path extending between the first and second circuit nodes and including a voltage controlled shunt thereon, the voltage controlled shunt having a control terminal to control an amount of energy shunted over the first electrical path via the voltage controlled shunt;

a power up detection element comprising an input coupled to the circuit, and an output coupled to the control terminal of the voltage controlled shunt;

a second electrical path in parallel with the first electrical path and including an ESD detection element thereon; and a voltage bias element having first and second inputs coupled to the power up detection element and the ESD detection element, respectively, and having an output coupled to the control terminal of the voltage controlled shunt, wherein the voltage bias element comprises:

a timing pulse generator coupled to the ESD detection element and configured to provide a shunt control signal having a predetermined duration based on whether the ESD detection element detects an ESD pulse; and a noise immunity circuit to disable the energy transfer over the first electrical path based on whether the power up detection element detects the circuit is powered up;

wherein the power up detection element receives a signal different than signals at the first and second circuit nodes from the circuit, monitors a voltage of the signal to determine whether the circuit is powered up, and selectively asserts a power-up signal at the output based on whether the circuit is powered up; and wherein the voltage controlled shunt controls the amount of energy shunted over the first electrical path based on the power-up signal.

2. The ESD protection device of claim 1, wherein the voltage controlled shunt comprises a drain extended metal oxide semiconductor (DEMOS) transistor.

3. The ESD protection device of claim 1, wherein the ESD detection element is configured to selectively provide an ESD detection signal based on whether a voltage on the first circuit node exceeds a predetermined voltage threshold.

4. The ESD protection device of claim 1, wherein the voltage bias element selectively provides a shunt signal to the control terminal of the voltage controlled shunt based on both a power-up signal from the power up detection element and an ESD detection signal from the ESD detection element.

5. The ESD protection device of claim 1, wherein, when the power up signal indicates the circuit is powered up, the voltage bias element sets a voltage level of the shunt signal to limit or prevent energy from being transferred over the voltage controlled shunt, regardless of a voltage level of the ESD detection signal.

6. The ESD protection device of claim 1, wherein, when the power up signal indicates the circuit is not powered up, the voltage bias element sets a voltage level of the shunt signal based on the ESD detection signal to enable energy to be shunted over the first electrical path via the voltage controlled shunt.

7. The ESD protection device of claim 1, wherein the voltage controlled shunt comprises:
   a first switching element in series with a second switching element along the first electrical path.

8. A method of electrostatic discharge (ESD) protection in a circuit, wherein the circuit includes a voltage controlled shunt that is coupled between first and second circuit nodes and which is arranged to selectively shunt energy of an incoming ESD pulse from the first circuit node to the second first circuit node and away from a semiconductor device to be protected on the circuit, the method comprising:
   monitoring voltage on the first circuit node and asserting an ESD detection signal for a predetermined time if the slope and magnitude of the voltage exceed predetermined thresholds;
   receiving a signal different than signals at the first and second circuit nodes from the circuit;
   monitoring the signal to determine whether the circuit is powered up;
   selectively asserting a power up control signal, which discretely changes between only a powered-up state and a powered-off state, based on whether the circuit is powered up;
   providing a shunt control voltage to the voltage controlled shunt based on both the power up control signal and the ESD detection signal;
   wherein the voltage controlled shunt shunts energy of the incoming ESD pulse from the first circuit node to the second circuit node based on the shunt control voltage.

9. The method of claim 8, wherein the circuit comprises a system-on-chip (SoC) design that includes a number of blocks having different operating frequencies and different power supply domains.

10. An electrostatic discharge (ESD) protection device for protecting a semiconductor device of a circuit, the ESD protection device comprising:

a power up detection element to selectively assert a power up control signal, which discretely changes between only a powered-up state and a powered-off state, based on whether the circuit is powered up;

an ESD detection element to monitor voltage on a first circuit node and assert an ESD detection signal for a predetermined time if at least one of slope or magnitude of the monitored voltage exceed predetermined thresholds, wherein the predetermined thresholds are indicative of an incoming ESD pulse;

a voltage bias circuit to provide a control voltage based on the power up control signal and the ESD detection signal; and a voltage controlled shunt coupled between the first circuit node and a second circuit node and which is arranged to selectively shunt energy of the incoming ESD pulse from the first circuit node to the second circuit node based on the control voltage;

wherein the power up detection element comprises a resistor and a capacitor coupled to a node on which the power up control signal is provided.

11. The ESD protection device of claim 10, wherein the voltage controlled shunt comprises a drain extended metal oxide semiconductor (DEMOS) transistor having a drain coupled to the first circuit node and a source coupled to the second circuit node.

12. The ESD protection device of claim 10, wherein the voltage bias circuit comprises:
   a pull-up device to pull up the control voltage based on whether the ESD detection signal is asserted; and
   a pull-down device in series with the pull up device, wherein the pull-down device is adapted to pull down the control voltage based on whether the power up control signal is asserted after the ESD pulse has passed.

13. The ESD protection device of claim 10, wherein the power up detection element is further configured to monitor a signal from the circuit to determine whether the circuit is powered up, wherein the signal is different than signals at the first and second circuit nodes.

14. An electrostatic discharge (ESD) protection device to protect a circuit coupled to first and second circuit nodes from an ESD event, the ESD protection device comprising:
   a first electrical path extending between the first and second circuit nodes and including a voltage controlled shunt thereon, the voltage controlled shunt having a control terminal to control an amount of energy shunted over the first electrical path via the voltage controlled shunt;
   a power up detection element comprising an input coupled to the circuit, and an output coupled to the control terminal of the voltage controlled shunt;
   a second electrical path in parallel with the first electrical path and including an ESD detection element thereon; and
   a voltage bias element having first and second inputs coupled to the power up detection element and the ESD detection element, respectively, and having an output coupled to the control terminal of the voltage controlled shunt, wherein the voltage bias element comprises:
     a timing pulse generator coupled to the ESD detection element and configured to provide a shunt control signal having a predetermined duration based on whether the ESD detection element detects an ESD pulse; and
     a noise immunity circuit to disable the energy transfer over the first electrical path based on whether the power up detection element detects the circuit is powered up;

wherein the noise immunity circuit includes an inverting level shifter controlling a transistor to disable the timing pulse generator in response to the power up detection element detecting that the circuit is powered up.

* * * * *